Oct. 23, 1962     J. TOMITA ET AL     3,059,764
SILICONE TAPE
Filed April 14, 1958
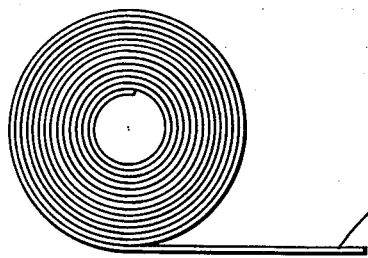
*Single layer of heat-bondable silicone tape – (no interliner between convolutions of tape layer in roll.)*
INVENTORS
JUN TOMITA
HERBERT M. BOND
*Carpenter, Abbott, Coulter, & Kinney*
ATTORNEYS

United States Patent Office 3,059,764
Patented Oct. 23, 1962

3,059,764
SILICONE TAPE
Jun Tomita, St. Paul, and Herbert M. Bond, Maplewood, Minn., assignors to Minnesota Mining and Manufacturing Company, St. Paul, Minn., a corporation of Delaware
Filed Apr. 14, 1958, Ser. No. 728,161
5 Claims. (Cl. 206—59)

This invention relates to tape articles especially adapted for use in high temperature electrical applications, and more particularly, to conveniently-handled and used rolls of heat-bondable silicone tape.

The tapes of this invention comprise a layer of silicone gum which is substantially cured throughout its mass, yet surprisingly is heat-bondable to itself to form a tough seal. In the preferred tape structure of this invention, this silicone layer alone constitutes our tape and is wound in convolutions upon itself in the roll. It is easily unwound from the roll and easily handled in practical use applications. It is self-supporting, needing no supporting backing or the like. The surfaces of this silicone tape product are not tacky. They are not pressure-sensitive and lack ability at normal room temperatures to stick well to themselves or other surfaces.

The tape layer is non-gobbing, i.e., it may be unwound from the roll into a pile without an inseparable wad of material resulting. No interliner need be inserted between the convolutions of the tape in a roll; yet in roll form, it does not block or fuse together. It may be stored in roll form without an interliner at room temperature or even slightly higher temperatures for lengthy periods, e.g., six months to a year or even longer, and after storage, may be unwound from the roll using essentially the same weak hand tension as employed to unwind it prior to storage. It is non-blocking.

As it is supplied in commerce, this layer is particularly resistant to "crepe hardening," i.e., hardening such as frequently exhibited by stored blends of silicone gum and fume silica. Yet silicone gum and silica of the fume silica type, or other reinforcing filler, are both present in our layer. Other various properties of the layer as herein defined also remain substantially unaffected with prolonged storage. Thus, our layer has the stability required of roll-tape articles for use and distribution in commerce.

Our layer is substantially cured; no more than about 10% by weight of its ingredients are soluble in xylene in a test involving immersing (i.e., soaking) the layer for 24 hours in xylene at 75° F. Yet it surprisingly additionally possesses the property of being heat-bondable to itself. It may be stretched at least 200% or more (even as much as 500% or more) under ordinary hand tension. When stretched and released, our layer substantially completely and immediately retracts essentially to its original length.

It may be stretched (usually at least about 50% of its length) and wrapped in overlapping convolutions upon itself around an object, for example, an electrical conduit or coil. After so wrapping it, a small piece of pressure-sensitive silicone tape may be used to hold the end of the wrapping in place. When the wrapping is then heated, e.g., at about 400° F. for 15–30 minutes or longer, it bonds to itself to form a tough, essentially-completely-insoluble and void-free, electrical insulation wrapping. Only heat and the slight pressure of the tape stretched and wrapped in convolutions upon itself are needed to accomplish such as bond. The final insulation wrapping can withstand extremes of temperature without deterioration.

The surprising combination of properties exhibited by this tape layer can be concisely summarized as follows: it is a substantially-cured, stable and storable single layer; it is non-blocking in roll form and can be marketed in a roll without an interliner; and it can be heat-bonded to itself in practical use applications without need for high pressures to accomplish the bond. There are other characteristics, vital characteristics, possessed, by our tape layer, but this concise summary of properties is considered sufficient for orientation with respect to the disclosure to follow.

A schematic illustration of an article of this invention is set forth in the drawing made a part hereof, showing a side elevation of a roll of our tape. It should be particularly noted that no interliner is needed to separate the convolutions of the tape layer in our roll.

Silicone tapes known to be heat-bondable have been available heretofore. Insofar as we are aware, however, prior art heat-bondable silicone tape structures have required a supporting backing, such as glass cloth, onto which the heat-bondable silicone composition has been spread. The backing of these prior art tapes has been essential for support of the heat-bondable silicone layer, yet in many applications a silicone wrapping free of foreign material such as a glass cloth backing is desired.

Another disadvantage of prior art heat-bondable silicone tapes has been their poor shelf life. Their heat-bondable silicone composition has frequently exhibited a tendency toward "crepe hardening," which has substantially decreased the heat-bondability of the tapes in practical use applications after they have been stored for a period of time, even a period of time as short as a month or so, which is clearly so short a time that some difficulty is encountered in presenting the product to the user before substantial degradation of heat-bondability takes place. Also, without an interliner, these prior art heat-bondable silicone tapes tend to block in roll form during shipment and storage preliminary to actual use, and unwinding them after storage is only accomplished with considerable difficulty or not at all.

Recently issued U.S. Patent No. 2,789,155 to Marshall et al. is also noted to be directed to a two-layer heat-bondable silicone sheet material, having a cured silicone backing layer and an uncured heat-bondable silicone coating thereon. As in the case of prior art heat-bondable tapes, Marshall et al. require a backing member on which their heat-bondable silicone material is spread. In the case of the Marshall et al. teaching, the heat-curable and bondable silicone layer is maintained in an uncured, relatively soft, and adhesive state, in which state it possesses relatively low cohesiveness and has poor resistance to scuffing and abrading during handling. Thus, no one insofar as is known, has ever heretofore solved the problem of providing a single-layer, easily-handled, heat-bondable silicone tape.

As in the case of the heat-bondable layer of prior art silicone tapes, the heat-bondable single silicone layer of this invention is formed using as an essential ingredient an organopolysiloxane gum. However, the gum used in making our heat-bondable layer is of generally higher viscosity than usually employed in prior art heat-bondable silicone layers; and in a material sense, the gum of our layer is substantially changed in the mass of the layer, in the presence of the other ingredients of the layer, so as to be in our finished roll-tape product, a material substantially different from its original state. Our finished tape layer, in roll form, is highly cohesive and has little or no practical adhesive characteristics. We also employ silica reinforcing fillers in making our tape product. As further ingredients, we usually employ at least two catalysts for the silicone gum component of the layer, one of which remains as a latent activator in the final tape article. While we employ two catalysts, both of which effect cross-linking of silicone gum by similar chemical means, we do not find it necessary to add the second catalyst after first heat processing the material with only the first catalyst present. We have been able to control the activity of these catalysts so as to cause each to function essentially independently of the other, even though they both effect cross-linking by similar chemical means.

Inasmuch as we, in making our tape layer, substantially cure the silicone gum component, it would ordinarily be expected that we also would destroy the heat-bondability of the silicone gum, particularly that bondability to be exhibited in the absence of high pressures, as where the tape is merely wrapped in overlapping convolutions and heated. Of note is the fact that the absence of bondability is frequently so great in cured silicone layers that they are employed as release agent coatings. Surprisingly, however, we have found a way to impart latent or nascent cross-link-type bonding properties to the surfaces of a cured silicone layer. These bonding properties come into evidence at high temperatures, e.g., 400° F., but are latent at room temperature. Our investigation indicates that the bond so formed appears to be that arising from points of cross-linking between the silicone gum of the contacting surfaces between layers.

We have further found that, although the gum of our layer is substantially cured, even further curing of the gum, particularly at the surfaces of the tape layer, can be effected. This further curing, contrary to what might be expected, can be accomplished within extremely brief periods of time, e.g., periods as short as 15–30 minutes. Normally it would be expected that even a slight further cure of a substantially cured silicone layer would require a lengthy heating cycle, as the curing curve (i.e., rate of cure) for silicone gums is well known to flatten out after high gel contents are reached.

In practice the tape layer to which this invention is particularly directed should be between about 5 to 30 mils thick for use in most electrical applications, but thinner or thicker tape layers may be formed for special applications, as desired or necessary. Also, if desired, our silicone layer may be laminated to one or both sides of various materials, e.g. glass cloth, mica, etc.; but in many electrical applications such laminated structures are undesired.

We will now describe our invention further in connection with several illustrative specific but non-limitative examples.

*Example 1*

| | Parts by weight |
|---|---|
| "Silastic 50U" | 100 |
| "Cadox TS" (50% 2,4-dichlorobenzoyl peroxide dispersed in low viscosity silicone oil) | 1 |
| "Di Cup 40C" (40% dicumyl peroxide in 60% $CaCO_3$) | 1.25 |

"Silastic 50U" is a commercial product of Dow Corning Company consisting essentially of about 70% by weight of a xylene-soluble, normally-solid, diorganopolysiloxane gum and about 30% by weight of a finely-divided (averaging about 15–20 millimicrons particle size) fume silica filler. The diorganopolysiloxane gum of this blend is one wherein the R to Si ratio is about 1.98 to 2.02, and where the R radicals are essentially methyl with only approximately 0.2% of the radicals being vinyl.

The "Silastic 50U" was first worked at room temperature on a rubber mill for about 2 minutes to render the mass plastic. At the conclusion of working, the "Silastic 50U" banded upon one of the rolls of the mill. Then the "Cadox TS" was added to this formulation and blended into the mixture for about 1 minute on the rubber mill. Subsequently, the "Di Cup 40C" was blended into the mixture in another 1 minute of milling on the rubber mill. Working on the mill caused a slight increase in temperature but such increase was insufficient to heat-trigger either of the two peroxide catalysts.

The blended mass from the mill was calendered into a layer approximately 10 mils thick supported on a thin, smooth, non-porous, non-adhesive, polytetrafluoroethylene sheet. The uncured silicone film and the polytetrafluoroethylene sheet were then wound together into a roll, with the polytetrafluoroethylene sheet serving as an interliner between the convolutions of the uncured silicone film or layer in the roll. The entire roll was then heated in an oven about 2 hours at about 250° F., under which conditions the 2,4-dichlorobenzoyl peroxide catalyst was essentially completely activated, and served to substantially cure the silicone gum material in the silicone layer.

After the heat-treated roll of silicone layer and polytetrafluoroethylene liner cooled to room temperature, the silicone layer was separated from the polytetrafluoroethylene liner, was cut into strips, and wound in overlapping convolutions upon itself, without an interliner, into a roll.

Less than 10% by weight of this silicone layer was dissolved by xylene in an exposure test involving soaking a sample of the layer for 24 hours in xylene at about 75° F. The tensile strength properties of this tape were tested and found to be about 750 p.s.i. at an elongation of 520%. It has a Shore A hardness of about 30. It was not tacky, was easily unwound from the roll, and could be stretched at least about twice its length by ordinary hand tension. When so stretched and wrapped in overlapping convolutions upon itself around a conductor, and then heated for about one or two hours at 400° F., it gave a tough, substantially-insoluble, void-free insulation wrapping. Even 30 minutes of heating at 400° F. has been noted to give bonds of good strength between layers of the wrapped tape. During heating, the tape surfaces bond to each other through sites at which cross-linking takes place. Heating at 400° F. also triggers the dicumyl peroxide catalyst and causes a further cure of the already largely cured silicone mass of the tape.

The roll of tape of this example, free of an interliner, was stored for six months under room temperature conditions, as it would be in shipping it to distributors and users. At the end of this storage, the properties, as aforedelineated, were essentially retained. The tape had not blocked in the roll. It could be unwound with essentially the same unwinding force, i.e., simple hand tension, as employed in unwinding it initially after its formation. It exhibited essentially no crepe hardening during storage. It still gave tough seals and formed strong heat-bonds as aforespecified. The tape is appropriately called storable and room-temperature-stable.

*Example 2*

To the formula of Example 1 was added 10 parts of Dow Corning Corporation's "A-4003" silicone resin mixture, which latter is soluble in xylene and consists of a blended mixture of about 75 parts silicone resin and about 25 parts silicone gum. The silicone resin in this mixture is understood to be a copolymer of $(CH_3)_3SiO_{1/2}$ units and $SiO_2$ units having a ratio of $(CH_3)_3SiO_{1/2}$ units to SiO₂ units of about 0.85; and the silicone gum is essentially a dimethylpolysiloxane.

The method of making the roll of tape of Example 1 was used also for this example, except that the "A-4003" was blended into the "Silastic 50U" on the mill prior to adding the catalysts. In other respects, the tape layer was formed, cut into strips, and wound into a roll on a core without an interliner as specified in Example 1. The tape in the roll without an interliner did not block when stored for lengthy periods at room temperature.

This layer had a tensile of about 700 p.s.i. at 600% elongation. Its Shore A hardness was about 28. Only about 10% of the layer was dissolved in the immersion test in xylene for 24 hours at 75° F., indicating, we believe, that some substantial proportion of the resin constituent was cross-linked either with itself or with the silicone gum of the layer. Tough bonds between layers of this tape (stretched and wrapped in overlapping convolutions) could be formed by heating the contacting layers for 15 minutes at 400° F. Bonds formed from this tape layer showed a slight "fusion" or flowing together of ingredients when heated, presumably accountable to the resin ingredient in particular; but in primary respects, the strength of the heat-formed bonds between wrapped layers of this tape arose from cross-linking which took place between the contacting surfaces of the layers.

A major feature to observe in connection with the foregoing examples is that the amount of low temperature catalyst added is at least sufficient to effect substantial curing of the silicone gum component of the tape layer, so that at least about 90% of the resulting layer is insoluble in xylene in the exposure test. Another way of putting this is to point out that immersion of the finished tape layer in xylene for 24 hours will not dissolve more than about 10% of the weight of the layer, and usually not even that much. Assuming that the only soluble constituent of the layer is some silicone gum which was not cross-linked to a gel state during preparation of the layer, we have determined that no more than 15% (usually much less) of the original xylene-soluble gum remains in a soluble state in the tape layer which is to be marketed. The silicone gum of the tape layer is, therefore, substantially cured in the preparation of the layer.

Although the amount of low temperature catalyst used in making our layers may, in some cases, exceed the amount necessary to render the silicone gum component at least 85% insoluble in xylene (and up to about 95% insoluble in xylene), we have found that layers prepared with no great excess of low temperature catalyst are the more preferable from a commercial standpoint. Layers so prepared have greater stability properties over lengthy periods of storage at room temperature than those prepared with an excess of catalyst above that required for curing in the manufacture of the tape as aforespecified.

In addition to the low temperature catalyst, which is essentially fully expended in the process of preparing our layer, and which effects the required substantial curing of the layer, we also employ a high temperature acting catalyst, which remains in the layer as a latent heat-activatible curing agent. The high temperature catalyst is present in an amount between about 0.3 and 3 parts per 100 parts of silicone gum in the layer. The most outstanding property imparted to the layer by the high temperature catalyst is that of tending to augment, excite or raise the nascent bonding properties of the layer surfaces, as the layer is raised to a temperature at which the high temperature catalyst is activated. While we do not wish to be bound by theory, it is indeed possible that the manner in which the high temperature catalyst raises the nascent bonding properties of the surfaces of the layer results in part from a generation of some new sites for surface-to-surface cross-linking to take place when the high temperature catalyst is activated.

In preparing our tape layer, two catalysts are selected which are heat-triggered or activated at different temperatures, a differential in the temperature of heat-activation of at least 50° F. being preferred. Thus, where the selected low temperature catalyst is heat-triggered at about 250° F., the high temperature catalyst, which remains latent in the resulting layer, should not be heat-triggered until a temperature of at least about 300° F. is reached. In practical commercial manufacturing operations, as well as in most practical use applications, it is found that the low temperature catalyst should, in fact, be heat-triggered in the range of about 125° F. to 250° F. and the high temperature catalyst in the range of about 280° F. to 400° F. Variations outside of these ranges are possible to use provided that the heat-triggering differential between the catalysts is at least about 50° F., but the most outstanding products are those which are formed using catalysts activatible within the range of temperatures aforespecified.

In practice, we have found that dibenzoyl peroxide (which is heat activated at around 250° F.) and 2,4-dichlorobenzoyl peroxide (which is heat activated at around 240° F.) have given especially desired results as "low temperature" catalysts which are essentially completely triggered or activated in the process of preparing our layer. As the high temperature catalyst, ditertiary butyl peroxide (which is heated activated about 320° F.), and dicumyl peroxide (which is heat activated at about 300° F.), have been most successfully used. Other organic peroxide catalysts for silicone gums may equally be suitable to use, provided the principles here set forth are followed in making the selection. Alternatively, a latent "high temperature" peroxide catalyst may be employed in combination with preliminary means to effect cure such as electron irradiation; but greatest success has been experienced when employing two catalysts and controlled conditions as illustrated.

Silicone gums to employ as starting raw materials should be those which have a viscosity of at least about 1,000,000 centistokes at 25° C. Many different gum polymers may be used. A straight dimethyl polysiloxane may be used. Likewise polymethylsiloxane gums containing some phenyl groups (e.g., up to about 10% by weight) may be used. Suitable gums are polymers of

units, where R is an organic radical and $n$ has a value of 1.98 to 2.02 (i.e., suitably organopolysiloxane gums have a ratio of R to Si of about 1.98 to 2.02). They are usually linear in structure. They may be characterized as diorganopolysiloxanes, and their R groups are at least about 90% methyl. Preferred gums also contain up to about 5% of olefinically unsaturated R groups such as vinyl, allyl, etc. Silicone gums for use in making our rolls of tape may be prepared by any of several suitable methods well known to the art.

Fume silica is the preferred reinforcing filler to employ and is used in the range of at least about 10 parts up to 100 parts by weight for every 100 parts of silicone gum in the layer. Additions of other suitable fillers which tend to reinforce and strengthen the cured layer hereof may be used, e.g., fillers such as calcium carbonate, titanium dioxide, etc. However, at least 10 parts (preferably at least 30 parts) of silica for every 100 parts of silicone gum in the layer is required; and a total filler content of at least about 30 parts for every 100 parts of gum is necessary. Reinforcement is essential, but a content of filler greatly in excess of the amount of gum in the layer tends to cause degradation of other required properties of the layer.

Example 2 illustrates a rather large content of silicone resin for our layer, and is near the maximum limit permissible for gaining the advantages of the addition, while still retaining the essential and distinguishing characteristics of the layer, particularly those characteristics relative to the lack of need for an interliner between convolutions of our tape layer in roll form. Amounts of resin greater than 15 parts by weight for every 100 parts by weight of gum in the layer are to be avoided. As the silicone resin constituent, we suggest that resins be used which are, in essential respects, copolymers of $R_3SiO_{1/2}$ units and $SiO_2$ units where R is preferably an alkyl radical of less than 4 carbon atoms or a phenyl radical, and where the ratio of $R_3SiO_{1/2}$ units to $SiO_2$ units is between about 0.6 and 0.9 inclusive. At least 90% of the total number of R radicals in these resins are preferably alkyl, methyl being by far the most common alkyl radical.

It will be appreciated that pigments, colorants and various other ingredients may be incorporated in our tape layers, where desired for special properties in the tape layer, but that such ingredients will not be employed in amounts sufficient to upset the characteristics and the distinguishing properties of our layer as aforedescribed.

We thus have made available an entirely new type of heat-bondable silicone tape article, comprising a layer which is readily extensible, substantially cured and yet heat-bondable to itself, and which is storable and non-blocking in roll form, even without an interliner separating convolutions of the tape in the roll. No such article has been known heretofore.

Our tape articles are particularly useful to use in insulating cables, motor coils, bus bars, etc. They are easy to use and to handle; and difficulties arising in unwrapping tapes having disposable interliners are obviated.

That which is claimed is:

1. As a new tape article: a length of tape wound in overlapping convolutions upon itself in a roll, non-blocking in said roll even when free of a disposable interliner between the convolutions in said roll, said tape being easily unwound from said roll by using ordinary hand tension in drawing it therefrom even after storage, and comprising a layer of silicone material having essentially uniform composition throughout the mass thereof and being less than about 10% soluble in xylene, said silicone layer being heat-bondable to itself, the ingredients of said layer being uniformly blended and consisting essentially of a substantially cured diorganopolysiloxane gum, said gum being substantially cured by a low-temperature heat-activated organic peroxide catalyst so as to be less than 15% soluble in xylene, between 30 and 100 parts by weight of reinforcing inorganic filler powder for every 100 parts by weight of silicone gum, at least 10 parts of said filler being finely divided silica, and a latent heat-activatible peroxide catalyst for said gum, said last mentioned heat-activatible catalyst requiring a temperature for activation up to 400° F. and at least approximately 50° F. above that temperature at which said low-temperature heat-activated catalyst was activated, the surfaces of said layer being characterized by having heat-activatible nascent bonding properties of the cross-linking type when pressed into intimate contact with each other and then heated to 400° F.

2. The article of claim 1 wherein the blended silicone layer contains up to 15 parts of an organopolysiloxane resin for every 100 parts of diorganopolysiloxane gum, the resin being composed essentially of $R_3SiO_{1/2}$ units and $SiO_2$ units, where R is an organic radical and the ratio of $R_3SiO_{1/2}$ units to $SiO_2$ units is between about 0.6 and 0.9 inclusive.

3. As a new tape article: a length of tape wound in overlapping convolutions upon itself in a roll, non-blocking in said roll even when free of a disposable interliner between the convolutions in said roll, said tape being easily unwound from said roll by drawing it therefrom using ordinary hand tension even after storage, and comprising a layer of silicone material having essentially uniform composition throughout the mass thereof and being less than 10% soluble in xylene, said layer being heat-bondable to itself, the ingredients of said layer being uniformly blended and consisting essentially of (1) a substantially cured organopolysiloxane gum having a ratio of R to Si of between 1.98 and 2.02, where R is a monovalent organic radical and where at least about 90% of the monovalent organic radicals in said organopolysiloxane are methyl, said gum being substantially cured by a low-temperature heat-activated organic peroxide catalyst so as to be less than 15% soluble in xylene, (2) between 30 and 100 parts by weight of reinforcing inorganic filler powder for every 100 parts by weight of said gum, at least 10 parts of said filler being finely divided silica, and (3) between 0.3 and 3 parts per 100 parts of said gum of a latent heat-activatible peroxide catalyst capable of effecting further cure of said gum, said latent catalyst requiring a temperature at least above that temperature at which said low-temperature heat-activated catalyst was activated and not in excess of 400° F., said layer being characterized by having surfaces which possess heat-activatible nascent bonding properties of the cross-linking type when pressed into intimate contact with each other and then heated to 400° F.

4. A new storable heat-bondable silicone tape article consisting of a layer of silicone tape wound in overlapping convolutions upon itself in a roll, non-blocking in said roll even when free of a disposable interliner between the convolutions in said roll, said layer being easily unwound from said roll by drawing it therefrom under ordinary hand tension even after storage, said layer being stretchable to at least 200% of its original length and substantially completely retractable upon release of stress after stretching, and consisting essentially of a uniform blend of (1) a substantially cured organopolysiloxane gum having a ratio of R to Si of between 1.98 and 2.02, where R is a monovalent organic radical and where at least about 90% of the monovalent organic radicals of said organopolysiloxane are methyl, said gum being cured by an organic peroxide activated at a temperature between about 125° F. and 250° F. so as to be less than 15% soluble in xylene, (2) between 30 and 100 parts by weight of reinforcing inorganic filler powder for every 100 parts by weight of said gum, at least 10 parts of said filler being finely divided silica, and (3) a small amount of a latent organic peroxide catalyst which requires a temperature of between about 280° F. and 400° F. for activation, said layer being characterized by having surfaces which possess heat-activatible nascent bonding properties of the cross-linking type when pressed into intimate contact with each other and then heated to 400° F.

5. As a new tape article: a length of tape wound in overlapping convolutions upon itself in a roll, nonblocking in said roll even when free of a disposable interliner between the convolutions in said roll, said tape being easily unwound from said roll by drawing it therefrom using ordinary hand tension even after storage, and comprising a layer of silicone material having essentially uniform composition throughout the mass thereof and being less than 10% soluble in xylene, said layer being heat-bondable to itself, the ingredients of said layer being uniformly blended and consisting essentially of (1) a substantially cured organopolysiloxane gum having a ratio of R to Si of between 1.98 and 2.02, where R is a monovalent organic radical and where at least about 90% of the monovalent organic radicals in said organopolysiloxane are methyl, said gum being substantially cured by a heat-activated organic peroxide catalyst so as to be less than 15% soluble in xylene, (2) between 30 and 100 parts by weight of reinforcing inorganic filler powder for every 100 parts by weight of said gum, at least 10 parts of said filler being finely divided silica, and (3) a latent heat-activatible peroxide catalyst for said gum, said last mentioned heat-activatible catalyst requiring a temperature for activation at least approximately 50° F. above that temperature at which said aforementioned heat-activated catalyst was activated and no higher than 400° F., said layer being characterized by having surfaces which possess heat-activatible nascent bonding properties of the cross-linking type when pressed into intimate contact with each other and then heated to 400° F.

References Cited in the file of this patent

UNITED STATES PATENTS

| | | |
|---|---|---|
| 2,672,978 | Hickox | Mar. 23, 1954 |
| 2,744,079 | Kilbourne et al. | May 1, 1956 |
| 2,803,619 | Dickmann | Aug. 20, 1957 |
| 2,809,180 | Browning et al. | Oct. 8, 1957 |
| 2,819,236 | Dickmann | Jan. 7, 1958 |

FOREIGN PATENTS

| | | |
|---|---|---|
| 685,731 | Great Britain | Jan. 7, 1953 |
| 755,762 | Great Britain | Aug. 29, 1956 |

OTHER REFERENCES

129 "India Rubber World," pp. 481–484, 488, January 1954.